(12) United States Patent
Morrison et al.

(10) Patent No.: US 9,811,543 B2
(45) Date of Patent: *Nov. 7, 2017

(54) SYSTEMS AND METHODS FOR GENERATING SCHEMAS THAT REPRESENT MULTIPLE DATA SOURCES

(71) Applicant: Comprehend Systems, Inc., Redwood City, CA (US)

(72) Inventors: Rick Morrison, Palo Alto, CA (US); Jud Gardner, Palo Alto, CA (US); Matthew Saffer, Palo Alto, CA (US)

(73) Assignee: Comprehend Systems, Inc., Redwood City, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 14/667,272

(22) Filed: Mar. 24, 2015

(65) Prior Publication Data
US 2015/0199389 A1 Jul. 16, 2015

Related U.S. Application Data

(63) Continuation of application No. 13/251,149, filed on Sep. 30, 2011, now Pat. No. 9,020,981.

(51) Int. Cl.
*G06F 17/30* (2006.01)

(52) U.S. Cl.
CPC .. *G06F 17/30292* (2013.01); *G06F 17/30557* (2013.01); *G06F 17/30542* (2013.01);
(Continued)

(58) Field of Classification Search
CPC ......... G06F 17/30292; G06F 17/30557; G06F 17/30542; G06F 17/30566; G06F 17/30914; G06F 17/30929
(Continued)

(56) References Cited

U.S. PATENT DOCUMENTS 6,366,916 B1 4/2002 Baer et al.
6,697,818 B2 2/2004 Li et al.
(Continued)

FOREIGN PATENT DOCUMENTS

EP 2761425 8/2014
GB WO 2011110809 A1 * 9/2011 ....... G06F 17/30557
(Continued)

OTHER PUBLICATIONS

Final Office Action, dated Nov. 17, 2015, U.S. Appl. No. 14/549,294, filed Nov. 20, 2014.
(Continued)

*Primary Examiner* — Dangelino Gortayo
(74) *Attorney, Agent, or Firm* — Carr & Ferrell LLP

(57) ABSTRACT

Systems and methods generating schemas that represent multiple data sources are provided herein. According to some embodiments, methods may include determining a schema for each of the multiple data sources via a computing device communicatively couplable with each of the multiple data sources, each of the multiple data sources including one or more data structures that define how data is stored in the data source, generating a negotiated schema by comparing the schemas of the multiple data sources to one another and interrelating data points of the multiple data sources based upon the schemas, interrelating the negotiated schema with the schema for each of the multiple data sources based upon the interrelation of the data points, and storing the negotiated schema in a storage media by way of the computing device.

20 Claims, 5 Drawing Sheets

(52) U.S. Cl.
CPC .. *G06F 17/30566* (2013.01); *G06F 17/30864* (2013.01); *G06F 17/30929* (2013.01)

(58) Field of Classification Search
USPC ........ 707/769, 756, 760, 803, 804, 808, 809
See application file for complete search history.

(56) References Cited

U.S. PATENT DOCUMENTS

| | | | |
|---|---|---|---|
| 7,305,614 B2* | 12/2007 | Chen | G06F 17/2264 |
| | | | 715/230 |
| 7,496,593 B2 | 2/2009 | Gardner et al. | |
| 7,693,900 B2 | 4/2010 | Wilmering et al. | |
| 7,702,636 B1 | 4/2010 | Sholtis et al. | |
| 7,761,480 B2* | 7/2010 | Toledano | G06F 17/30463 |
| | | | 707/804 |
| 7,792,817 B2* | 9/2010 | Shan | G06F 17/30566 |
| | | | 707/705 |
| 7,853,576 B2 | 12/2010 | Narang et al. | |
| 7,877,421 B2 | 1/2011 | Berger et al. | |
| 7,962,512 B1 | 6/2011 | Sholtis et al. | |
| 8,078,647 B2 | 12/2011 | Liang et al. | |
| 8,082,322 B1 | 12/2011 | Pascarella et al. | |
| 8,103,740 B1 | 1/2012 | Abramov et al. | |
| 8,108,366 B2 | 1/2012 | Dettinger et al. | |
| 8,234,312 B2 | 7/2012 | Thomas | |
| 8,250,101 B2 | 8/2012 | Fot et al. | |
| 8,255,871 B1 | 8/2012 | Kompella et al. | |
| 8,346,819 B2* | 1/2013 | Do | G06F 17/30569 |
| | | | 707/760 |
| 8,386,493 B2* | 2/2013 | Muni | G06F 17/303 |
| | | | 707/740 |
| 8,412,746 B2* | 4/2013 | Fox | G06F 17/30292 |
| | | | 707/609 |
| 8,924,431 B2 | 12/2014 | Morrison et al. | |
| 9,020,981 B2 | 4/2015 | Morrison et al. | |
| 9,607,018 B2 | 3/2017 | Morrison et al. | |
| 2002/0198891 A1 | 12/2002 | Li et al. | |
| 2003/0177112 A1* | 9/2003 | Gardner | G06F 19/28 |
| | | | 707/999.003 |
| 2003/0217069 A1 | 11/2003 | Fagin et al. | |
| 2005/0050519 A1 | 3/2005 | Schulte et al. | |
| 2005/0240354 A1 | 10/2005 | Mamou et al. | |
| 2005/0267901 A1 | 12/2005 | Irlen | |
| 2007/0294323 A1 | 12/2007 | Narang et al. | |
| 2008/0016502 A1 | 1/2008 | Henderson et al. | |
| 2008/0256364 A1 | 10/2008 | Chang et al. | |
| 2009/0043825 A1 | 2/2009 | Bourne et al. | |
| 2009/0187594 A1 | 7/2009 | Chen et al. | |
| 2009/0240726 A1 | 9/2009 | Carter et al. | |
| 2010/0077007 A1 | 3/2010 | White et al. | |
| 2010/0251097 A1 | 9/2010 | Vincent, III | |
| 2010/0287158 A1 | 11/2010 | Toledano et al. | |
| 2011/0288877 A1 | 11/2011 | Ofek et al. | |
| 2012/0047425 A1 | 2/2012 | Ahmed | |
| 2012/0239428 A1 | 9/2012 | James et al. | |
| 2013/0086104 A1 | 4/2013 | Morrison et al. | |
| 2013/0086115 A1 | 4/2013 | Morrison et al. | |
| 2015/0081740 A1 | 3/2015 | Morrison et al. | |
| 2017/0249372 A1 | 8/2017 | Morrison et al. | |

FOREIGN PATENT DOCUMENTS

| | | |
|---|---|---|
| JP | 2007293838 A | 11/2007 |
| JP | 6165741 B2 | 7/2017 |
| WO | WO2013048828 | 4/2013 |
| WO | WO2013048829 | 4/2013 |

OTHER PUBLICATIONS

Advisory Action, dated Feb. 5, 2016, U.S. Appl. No. 14/549,294, filed Nov. 20, 2014.
Non-Final Office Action, dated Jul. 17, 2013, U.S. Appl. No. 13/251,132, filed Sep. 30, 2011.
Final Office Action, dated Dec. 4, 2013, U.S. Appl. No. 13/251,132, filed Sep. 30, 2011.
Advisory Action, dated Feb. 24, 2014, U.S. Appl. No. 13/251,132, filed Sep. 30, 2011.
Notice of Allowance, dated Sep. 15, 2014, U.S. Appl. No. 13/251,132, filed Sep. 30, 2011.
Non-Final Office Action, dated Nov. 19, 2012, U.S. Appl. No. 13/251,149, filed Sep. 30, 2011.
Non-Final Office Action, dated Jul. 26, 2013, U.S. Appl. No. 13/251,149, filed Sep. 30, 2011.
Final Office Action, dated Feb. 26, 2014, U.S. Appl. No. 13/251,149, filed Sep. 30, 2011.
Notice of Allowance, dated Jan. 15, 2015, U.S. Appl. No. 13/251,149, filed Sep. 30, 2011.
Extended European Search Report dated Jul. 17, 2015 in European Patent Application 12835982.5 filed Sep. 18, 2012.
Non-final, dated Jun. 10, 2015, U.S. Appl. No. 14/549,294, filed Nov. 20, 2014.
International Search Report and Written Opinion mailed Nov. 30, 2012 in Patent Cooperation Treaty Application PCT/US12/55953.
International Search Report and Written Opinion mailed Nov. 30, 2012 in Patent Cooperation Treaty Application PCT/US12/55947.
Comprehend, Data Sheet entitled "Comprehend Clinical", Copyright 2011.
Tsotsis, Alexia, Article entitled "Comprehend Systems Wants to Make Data Analysis Less of a Pain", dated Feb. 27, 2011.
"Office Action," Japanese Patent Application No. 2014-533605, Oct. 11, 2016, 4 pages [10 pages including translation].
Konishi et al., "Integration of Heterogeneous Information Sources," MediPresto/M, NTT R&D, Japan, Feb. 20, 2003, vol. 52 No. 2, pp. 107-114.
"Notice of Allowance," Japan Patent Application No. 2014-533605, May 23, 2017, 3 pages.
Non-final Office Action, dated Mar. 1, 2016, U.S. Appl. No. 14/549,294, filed Nov. 20, 2014.
Final Office Action, dated Aug. 31, 2016, U.S. Appl. No. 14/549,294, filed Nov. 20, 2014.
Advisory Action, dated Nov. 8, 2016, U.S. Appl. No. 14/549,294, filed Nov. 20, 2014.
Notice of Allowance, dated Dec. 12, 2016, U.S. Appl. No. 14/549,294, filed Nov. 20, 2014.

* cited by examiner

SYSTEMS AND METHODS FOR GENERATING SCHEMAS THAT REPRESENT MULTIPLE DATA SOURCES

CROSS-REFERENCE TO RELATED APPLICATIONS

This nonprovisional patent application is a continuation application of and claims priority benefit of U.S. patent application Ser. No. 13/251,149, filed Sep. 30, 2011, now U.S. Pat. No. 9,020,981, issued Apr. 28, 2015, and entitled "SYSTEMS AND METHODS FOR GENERATING SCHEMAS THAT REPRESENT MULTIPLE DATA SOURCES" and is also related to nonprovisional U.S. patent application Ser. No. 13/251,132, filed on Sep. 30, 2011, now U.S. Pat. No. 8,924,431, issued Dec. 30, 2014, and entitled "PLUGGABLE DOMAIN-SPECIFIC TYPING SYSTEMS AND METHODS OF USE," all of which are hereby incorporated by reference in their entirety.

BACKGROUND

Field of the Invention

The present technology relates generally to schema generation and negotiation for multiple data sources. More specifically, the present technology relates to systems and methods that negotiate data sources having different data structures, create schemas for interrelating or connecting the data within the data structures, and provide for querying across multiple data sources utilizing a negotiated schema.

Background

Interacting with data sources that utilize various types of data storage schemas (e.g., data storage protocols) for storing data can be a tedious endeavor. For example, while different data sources may include similar types of data, the data may be stored in data structures that have vastly different storage schemas or storage mechanisms relative to one another. Accessing similar types of data stored in differing data structures requires end users or computing systems to understand and navigate each of the data structures independently, which is a time consuming and tedious undertaking. The present technology provides systems and methods for negotiating various data sources by way of negotiated schemas that represent each of the data sources.

SUMMARY OF THE PRESENT TECHNOLOGY

According to some embodiments, the present technology may be directed to methods for generating a negotiated schema for multiple data sources. The methods may include: (a) determining a schema for each of the multiple data sources via a computing device communicatively couplable with each of the multiple data sources, each of the multiple data sources including one or more data structures or serialized data blobs that define how data is stored in the data source; (b) generating a negotiated schema by: (i) comparing the schemas of the multiple data sources to one another; and (ii) interrelating data points of the multiple data sources that correspond to one another; and (iii) interrelating the negotiated schema with the schema for each of the multiple data sources based upon the interrelation of the data points; and (c) storing the negotiated schema in a storage media by way of the computing device.

According to other embodiments, the present technology may be directed to systems for generating a negotiated schema for multiple data sources. The systems may include: (a) a memory for storing executable instructions; (b) a processor for executing the instructions, the instructions including: (i) an interrogation module that determines a schema for each of the multiple data sources, each of the multiple data sources including one or more data structures that define how data is stored in the data source; and (b) a schema generator that generates a negotiated schema by: (1) comparing the schemas of the multiple data sources to one another; and (2) interrelating data points of the multiple data sources, multiple pre-negotiated schemas, or an arbitrary number of pre-negotiated schemas and data sources that correspond to one another (3) interrelating the negotiated schema with the schema for each of the multiple data sources based upon the interrelation of the data points; and stores the negotiated schema in a storage media.

According to additional embodiments, the present technology may be directed to non-transitory computer readable storage media having a program embodied thereon, the program being executable by a processor to perform a method for generating a negotiated schema for multiple data sources. The method may include: (a) determining a schema for each of the multiple data sources via a computing device communicatively couplable with each of the multiple data sources, each of the multiple data sources including one or more data structures that define how data is stored in the data source; (b) generating a negotiated schema by: (i) comparing the schemas of the multiple data sources to one another; and (ii) interrelating data points of the multiple data sources that correspond to one another; (iii) interrelating the negotiated schema with the schema for each of the multiple data sources based upon the interrelation of the data points; and (c) storing the negotiated schema in a storage media by way of the computing device.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
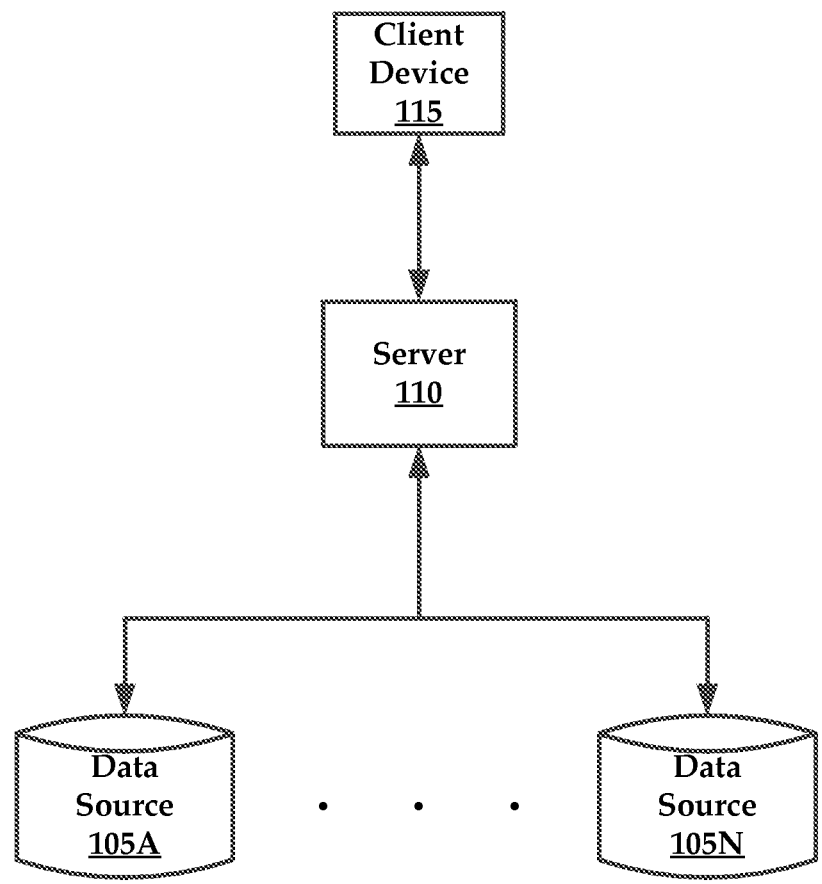
FIG. 1 is a block diagram of an exemplary system architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be directed to negotiating and generating schemas that represent multiple data sources. A negotiated schema may represent the interrelations between data structures of multiple data sources and link together related data points that may be stored in dissimilar data structures. Stated otherwise, the present technology may link or "interrelate" various types of data distributed across a wide variety of data systems.

It is noteworthy to mention that a schema may include an abstraction or abstract representation of a set of data, such as a data structure. For example, a data structure may include table of data, a graph, data tree, and so forth. The data structure may include a plurality of data points.

Other non-limiting examples of schema may include database tables and foreign keys, web APIs that return JSON result sets, flat files such as comma separated values ("CSV") or a spreadsheet file, not-only SQL ("NoSQL") data sources, and so forth. Additionally, it is possible to determine data structures from extracted data. For example, data blobs may be extracted from a compressed file, such as a .zip file. Once the data has been decompressed or extracted, the present technology may evaluate the data structure of the data blobs.

By way of non-limiting example, various types of patient data may be stored in a plurality of data sources, where each of the data sources utilizes a proprietary data structure (e.g., protocol such as health level 7 ("HL7") and so forth). One data source may have patient data such as blood pressure readings while another may include data such as adverse events. One of ordinary skill in the art will readily appreciate that practical embodiments of the present technology may utilize data structures or protocols for any number of different types of subject matter including, but not limited to finances, athletics, manufacturing, statistics, and so forth. Rather than requiring individual querying of each of the data sources for requested information, the present technology may interrelate data points within data structures to create a negotiated schema. End users may query the negotiated schema to obtain a combined rich query response that includes interrelated data from each of the data sources that corresponds to the query as well as associated metadata with each of the data points.

The present technology may interrogate each of plurality of data structures individually to determine a schema that is most closely related to data structure(s) of a particular data source. Interrogation of the data structures may include comparing the data structure of the data source to a plurality of schema templates and applying heuristics to determine the schema template that most closely (or at least partially) corresponds to the data structure of the data source. The heuristics that are applied to the data source may be based upon end user input, machine learning techniques, metadata tags, previous schema negotiations, predefined custom connectors or heuristics, and the like.

Schema templates may also be generated from end user input artificial intelligence techniques, or machine learning techniques which are applied to the data source.

Once a schema template has been selected or created for each data source, the present technology may generate a negotiated schema that represents the interrelationships between the data structures of the data sources, and more specifically, between the data included in the data structures.

The negotiated schema may be understood to include a comparison and linking of the individual schemas of each data source. The negotiated schema may also include new data structures that have been generated from the preexisting data.

The negotiated schema may be utilized to obtain data from the individual data structures via querying processes. The obtained data may be linked together or otherwise aggregated, assembled, joined, or interrelated together and presented to an end user as a query response. Advantageously, the response to the query may provide more robust information than would have been obtained via querying of the individual data sources alone. This advantage is due, in part, to the linking of data points or data structures via heuristic information that may link or interrelate seemingly unrelated data points. Furthermore, metadata associated with one or more of the schema templates may be applied to the negotiated schema to further enhance the information obtained during execution of a query.

FIG. 1 illustrates an exemplary system architecture for practicing aspects of the present technology. The architecture may include a plurality of data sources such as data sources 105A-N. Generally speaking, these data structures may include any of a database, a data stream, a data file, or any other mechanism for storing or organizing data in a structured format. Each of the data sources 105A-N may have a different data structure for storing data points in a particular format.

The data structures 105A-N may be communicatively couplable to a server 110 that includes executable instructions for determining a schema that corresponds to the data structure of the data source, and generating a negotiated schema by interrelating the schemas of each of the data sources 105A-N. The server 110 may communicatively couple with the data sources 105A-N via any of a number of private or public communications mediums such as the Internet. While not shown, in some embodiments, each of the data sources 105A-N may include an adapter that determines an appropriate schema for the data structure. The adapter may communicatively couple with the server 110.

It will be understood that in some embodiments, the architecture 100 may include a plurality of web servers (such as server 110) arranged into a cloud-based computing environment. According to some embodiments, the cloud-based computing environment negotiates and generates schemas that represent multiple data sources. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Amazon™; or such systems may be accessible to outside users who deploy applications within the computing infrastructure to obtain the benefit of large computational or storage resources.

The cloud may be formed, for example, by a network of servers with each server (or at least a plurality thereof) providing processor and/or storage resources. These servers may manage workloads provided by multiple users (e.g., cloud resource customers or other users). Typically, each user may place workload demands upon the cloud that vary in real-time, sometimes dramatically. The nature and extent of these variations typically depend on the type of business associated with the user.

A client device 115 may communicatively couple with the server 110 via an open application programming interface ("API"). Generally speaking, an application programming interface allows applications residing on different platforms or written in different programming languages to interoperate.

Figure 2:
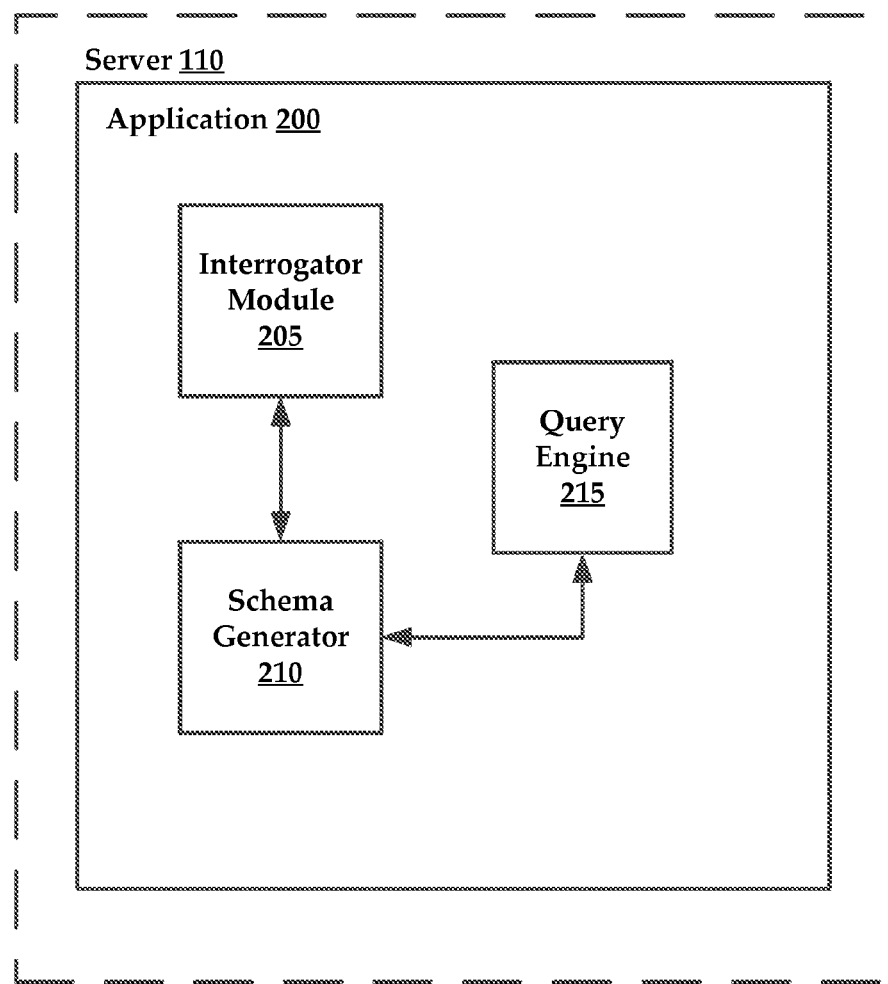
FIG. 2 is a block diagram of an exemplary application for generating schemas that represent multiple data sources and processing queries.

FIG. 2 illustrates a block diagram of the server 110 that includes a schema negotiation application, hereinafter referred to as "application 200." According to some embodiments, the application 200 may include one or more modules or engines that are adapted to effectuate respective functionalities attributed thereto. It will be understood that the processor of the server 110 may execute one or more of the constituent modules described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the application 200 may include separately configured servers (e.g., server 110).

In some embodiments, the application 200 may include an interrogation module 205, a schema generator 210, and a query engine 215. It is noteworthy that the application 200 may include additional modules, engines, or components, and still fall within the scope of the present technology.

The interrogation module 205 may be executed to interrogate each of the data sources 105A-N. The interrogation module 205 may utilize authentication credentials to access each data source. While it will be discussed in greater detail below relative to the querying of the data sources, the present technology may respect the underlying credentials of each data source during querying of the data source such that query results may only include data that the end user is qualified to access.

Interrogation may comprise determining a schema for each of the multiple data sources. The interrogation module 205 may determine a schema for a data source by comparing the data structure of the data source to a plurality of schema templates or preexisting negotiated schemas. Schema templates may include exemplary abstractions that represent different types of data sources. For example, a schema template may include an abstraction of a typical data source that utilizes HL7 protocols, or any other protocol. Therefore, when a data source of having an unknown type of data structure is encountered, if an HL7 schema template is compared against the data source, and the data structure of the data source corresponds to the HL7 schema, it may be inferred that the data structure utilizes an HL7 data structure.

The interrogation module 205 may iterate through many schema templates before locating an appropriate schema template. It will be understood that in some cases, an appropriate schema template may include a schema template that at least partially corresponds to the data structure. This partially corresponding schema template may be referred to as a "fuzzy" template match. For example, a schema template may indicate that data structures having five distinct types of data points (e.g., nodes) correspond to a known type of data structure (e.g., protocol). If a data structure includes four out of the five distinct types of data, it may be inferred that the data structure is a "fuzzy" match for the known type of data structure and so forth.

The interrogation module 205 may utilize heuristic logic to determine the correspondence between a data structure and a schema template. The heuristic logic may utilize end user input, machine learning techniques, metadata tags, previous schema negotiations, predefined custom connectors, heuristics, and so forth.

The correspondence or selection of a schema template by the interrogation module 205 may be subject to verification by an end user. This may be particularly true if the correspondence between the data source and the schema template is fuzzy. However, it is noteworthy to mention that in some embodiments that the processes described above may be executed automatically, without end user verification.

Metadata relative to the schema determinations of the interrogation module 205 may be overlaid upon the data source for future use. For example, metadata relative to schema templates that did not correspond to the data structure of the data source may be associated with the data source to ensure that subsequent iterations of the data source do not include these schema templates. Other types of metadata may include a relative matching strength for a fuzzy matching template (e.g., how likely the match is to be correct/errant).

Metadata may be attached to an object that is bucketed or "namespaced" to avoid logical collisions or confusion with other objects. The metadata utilized by the application 200 allows for the use of "effective" or "combined" metadata structures that may include metadata information not only for a given object, but also other dependent objects that have metadata as well.

In some embodiments, if more than one schema template at least partially corresponds to the data structure of the data source, the interrogation module 205 may employ heuristic logic or solicit end user verification to determine which schema template is the most appropriate.

According to some embodiments, a schema template may be created for the data source on-the-fly by the interrogation module 205 when an appropriate correspondence between the data source one of the plurality of schema templates is not found. This newly created schema template may be tagged with metadata and made available for future interrogations of data structures.

Upon interrogating each of the data sources 105A-N, the schema generator 210 may be executed to negotiate or create a negotiated schema that represents the data structures of multiple data sources 105A-N. A negotiated schema may also be referred to as an abstraction of the relationships between data stored in the data structures of the data sources. That is, based upon the schema template selected for each data source, the schema generator 210 may analyze the relationships between data points or nodes of the schemas of the data sources and link the nodes of the schemas accordingly.

In some embodiments, the schema generator 210 may again apply heuristic logic to determine relationships between the nodes (e.g., data points) of the individual schemas. Similarly to determining if a data structure corresponds to a schema template, corresponding or interrelated nodes of different schemas may be linked together. The nodes may be directly linked or indirectly linked. For example, directly linked data, such as patient blood pressure readings, may be collected from different data sources (e.g., blood pressure readings stored in multiple files that each has different proprietary data structure). Indirectly linked data may include different types of patient medial data that may be linked together via a transformation, or via social security number or other personally identifiable information. With regard to transformations or normalization of data, it may be the case that a value has a function such as $f(x)=x+1$ (i.e., formula that adds one to all values) applied to it in order to conform to a schema, for example. This indirect linking may allow for various types of data (e.g., blood pressure readings, prescriptions, surgical history, allergies, and so forth)

to be linked or interrelated based upon the fact that the data belongs to the same patient. Rather than having to obtain these disparate types of data from each individual data source, the negotiated schema may allow for the querying of the individual data sources at the same time, as will be described in greater detail below.

According to some embodiments, the schema generator 210 may establish connections or linkages between data sources 105A-N via utilizing one or more adaptive algorithms, such as recursive backtracking, hill-climbing, alpha-beta pruning, or any other suitable adaptive algorithm that would be known to one of ordinary skill in the art with the present disclosure before them.

In some embodiments, the connections of interrelations of data points may be subject to end user verification. Additionally, some or all of the connections between data points of various schemas may be configured manually via end user input. End user input may also be utilized to resolve conflicts between data sources. For example, when two data structures may be interrelated with the exception of one or more conflicting matches, end user input may be solicited by the schema generator 210 to resolve the conflict and generate a more robust negotiated schema. End user input may be stored in order to aid in and/or automate future schema negotiations.

Again, similarly to the interrogation module 205, the schema generator 210 may append metadata to the negotiated schema that includes information that corresponds to the linking of data points of schemas in creation of the negotiated schema. Metadata may include information such as resolved conflicts, reasons for linking two or more schemas, confidence level associated with a connection that represents the reliability or accuracy of a connection, and so forth.

According to some embodiments, the schema generator 210 may specify which, if any, of the data sources should be available to properly process a query. The schema generator 210 may also specify alternate data sources that may be accessed if a primary or "required" data source is unavailable. That is, the schema generator 210 may operate in a fault tolerant manner, such that if a required data source is unavailable, the system may process queries by locating alternate data sources or notifying the end user that a particular data source is unavailable.

In other embodiments, if no alternative data source is available the schema generator 210 may mark metadata in a returning result set appropriately. This metadata may be utilized enhance the efficiency of subsequent query processing.

In some embodiments, the schema generator 210 may be configured to automatically update a negotiated schema when the one or more data structures of one or more of the data sources changes. That is, as the data included in the data sources change over time, the negotiated schema is likewise updated such that queries executed against the negotiated schema include up-to-date information. Stated otherwise, the negotiated schemas are allowed to evolve as the data included in the data sources change.

In some instances notification of a change to a data source may occur at the point of the receipt of a query, according to a predefined interval of time, when a notification is provided from the underlying data source, and/or when a user creates a manual notification of a change. At this point, the application 200 enters a 'repair' mode in order to be fault-tolerant, and should be able to modify the schema representing the data without interruption of service, unless a required part of the negotiated schema has been modified.

The query engine 215 may be executed upon the server 110 receiving a query from a client device 115. It will be understood that the query may be provided to the server 110 via an API connection as described above. In other embodiments, the application 200 may generate a web based interface (not shown) that allows end users to interact with the application 200 via a browser that is executable on their client device 115. In some embodiments, the web based interface may provide a number of mechanisms that allow end users to query the data sources. In other embodiments, the application 200 may generate graphical user interfaces that allow end users to verify the use of a schema template or links between data sources.

Upon receiving a query, the query engine 215 may analyze the query to determine attributes of the query such as keywords, phrases, protocols, and so forth. The query may also specify which of the multiple data sources are to be searched by the query engine 215. In some embodiments, the query engine may infer or choose an appropriate data sources that are to be searched, based upon the keywords or other information included in the query.

Next, the query engine 215 obtains a negotiated schema that is to be utilized to process the query. Again, the query engine 215 may determine an appropriate negotiated schema based upon information included in the query.

It is noteworthy to mention that in some embodiments, the query engine 215 may execute the schema generator 210 to generate a negotiated schema based upon the information included in the query. For example, if the query specifies the data sources which are to be queried and keywords that are to be queried across those selected data sources, the schema generator 210 may obtain schemas for each of the data sources as described above. This method may be valuable when the query engine 215 is unable to determine an appropriate negotiated schema to be utilized to evaluate a query.

Once the query engine 215 has selected a negotiated schema, the query may be executed across each of the multiple data sources, possibly in parallel. Utilizing the interrelationships between data sources included in the negotiated schema, the query engine 215 may quickly and efficiently obtain data from the multiple data sources that correspond to the query.

The query engine 215 may utilize the appropriate authentication credentials of the end user that generated the query to access the data stored in the data sources. For example, the query engine 215 may utilize a secure API, certificate, or username/password combination that allows the end user to access the data sources. Because the query engine 215 utilizes the authentication credentials of the end user, only data that is appropriately accessible to the end user may be obtained by the query engine 215. That is, the query engine 215 respects the security protocols established for each data source.

Once data points are obtained from the data sources, the query engine 215 may combine or otherwise aggregate the obtained data into a query response that is then provided to the end user via their client device.

In sum, the application 200 allows for end users to utilize "best of breed" systems that produce data that is stored in many different data structures. That is, rather than being bound by the data structures utilized by different applications, the application 200 allows for data processing that is agnostic to the data structure of the data source. In this way, an end user may select which applications they wish to employ, not on the basis of the data structures (e.g., file formats and protocols) themselves, but on the performance of the application itself. The application 200 ensures that queries may be executed across these disparate data sources without regard to the data structures themselves. Additionally, the schema negotiation and creation process may occur entirely transparent to the end user.

Figure 3:
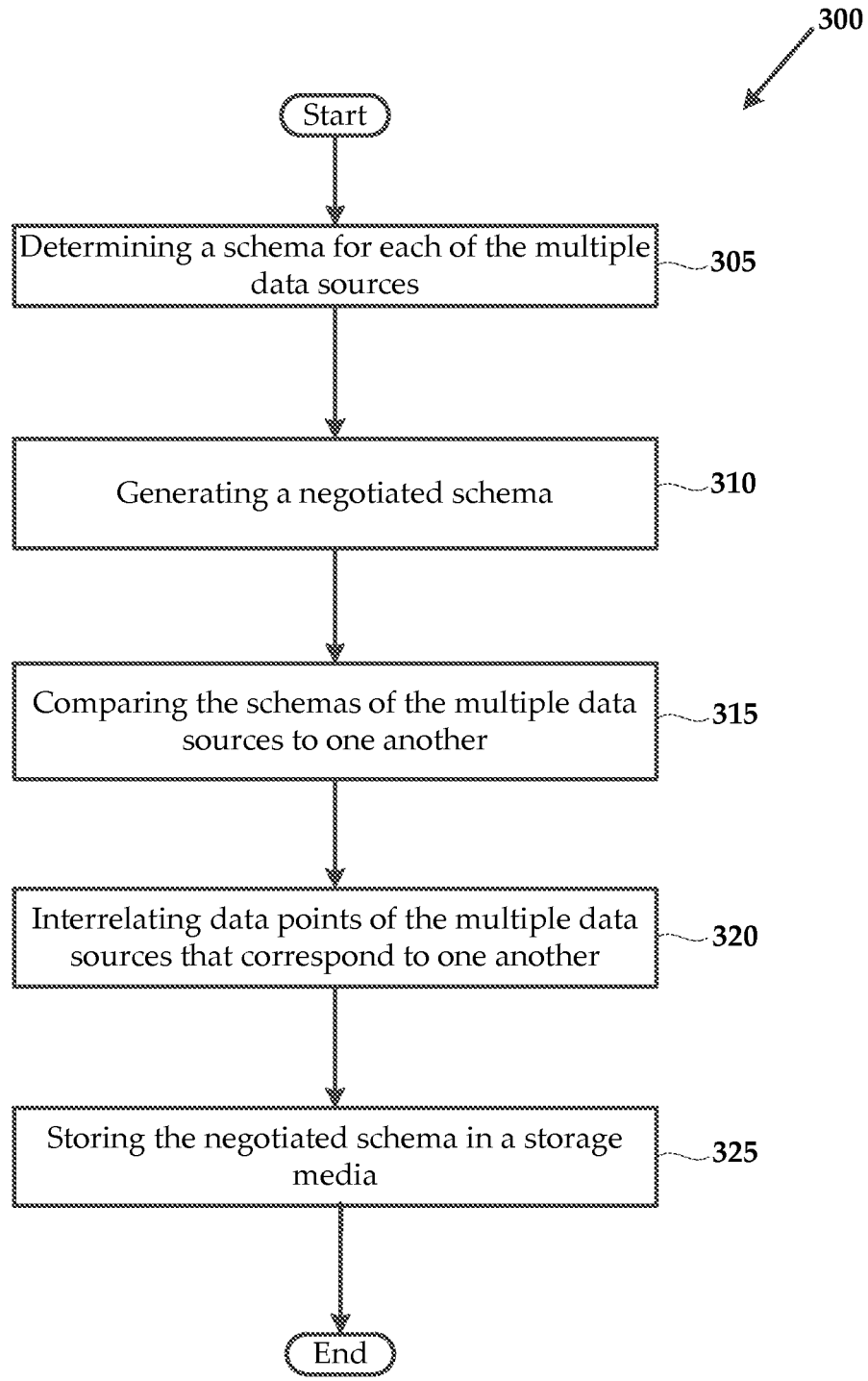
FIG. 3 illustrates a flowchart of an exemplary method for generating schemas that represent multiple data sources.

FIG. 3 illustrates a flow diagram of an exemplary method 300 for generating negotiated schemas for multiple data sources. The method 300 may include a step 305 of determining a schema for each of the multiple data sources via a computing device communicatively couplable with each of the multiple data sources.

It will be understood that each of the multiple data sources may include one or more data structures that define how data is stored in the data source. Upon determining a schema for each of the multiple data sources, the method 300 may include a step 310 of generating a negotiated schema by a step 315 of comparing the schemas of the multiple data sources to one another. After comparing the schemas, the method may include a step 320 of interrelating data points of the multiple data sources based upon the schemas. Lastly, the method 300 may include a step 325 of storing the negotiated schema in a storage media.

Figure 4:
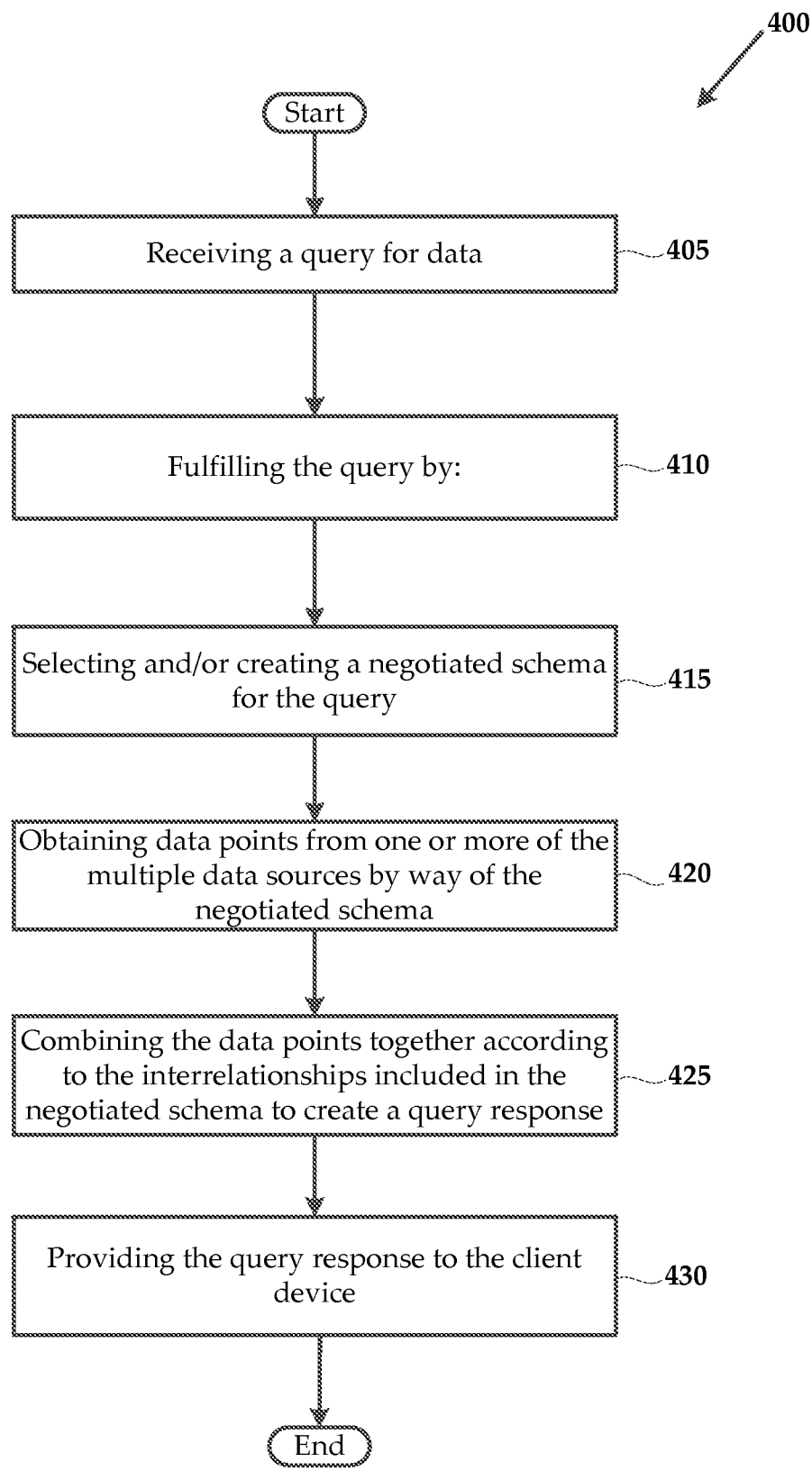
FIG. 4 illustrates a flowchart of an exemplary method for executing a query across multiple data sources utilizing a negotiated schema.

FIG. 4 illustrates a flow diagram of an exemplary method 400 for executing a query across multiple data sources utilizing a negotiated schema. The method 400 may include a step 405 of receiving a query for data from a client device.

Next, the method may include a step 410 of fulfilling the query by executing a step 415 of selecting and/or creating a negotiated schema for the query. Again, a negotiated schema may be selected by analyzing keywords or other information included in the query. If no negotiated schema is located, a negotiated schema may be created in the manner described in greater detail above.

After selecting an appropriate negotiated schema, the method 400 may include a step 420 of obtaining data points from one or more of the multiple data sources by way of the negotiated schema. That is, the data may be obtained from the multiple data sources by way of the interrelation of data points and/or data structures included in the negotiated schema.

Next, the method 400 may include a step 425 of combining the data points together according to the interrelationships included in the negotiated schema to create a query response, and finally a step 430 of providing the query response to the client device.

Figure 5:
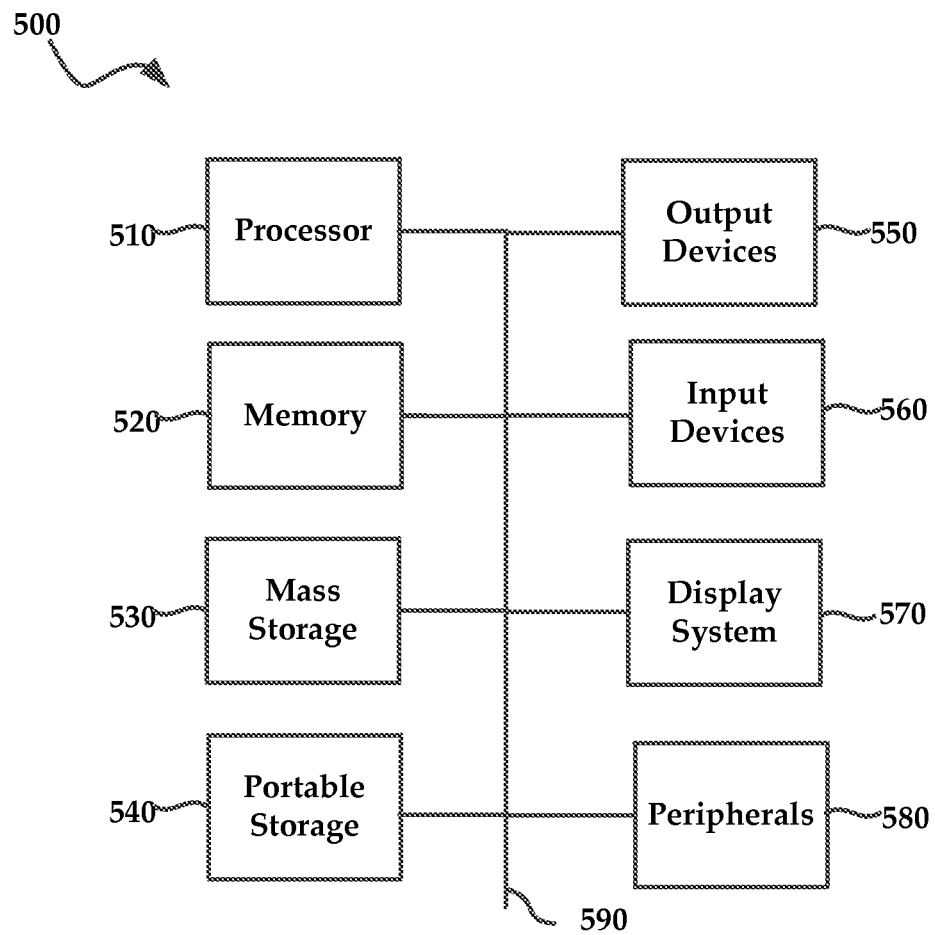
FIG. 5 illustrates an exemplary computing system that may be used to implement embodiments according to the present technology.

FIG. 5 illustrates an exemplary computing system 500 that may be used to implement an embodiment of the present technology. The computing system 500 of FIG. 5 may be implemented in the contexts of the likes of computing systems, networks, servers, or combinations thereof. The computing system 500 of FIG. 5 includes one or more processors 510 and main memory 520. Main memory 520 stores, in part, instructions and data for execution by processor 510. Main memory 520 may store the executable code when in operation. The system 500 of FIG. 5 further includes a mass storage device 530, portable storage device 540, output devices 550, user input devices 560, a display system 570, and peripheral devices 580.

The components shown in FIG. 5 are depicted as being connected via a single bus 590. The components may be connected through one or more data transport means. Processor 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive, an optical disk drive, or SSD is a non-volatile storage device for storing data and instructions for use by processor 510. Mass storage device 530 may store the system software for implementing embodiments of the present technology for purposes of loading that software into main memory 520.

Portable storage device 540 operates in conjunction with a portable non-volatile storage medium, such as a floppy disk, compact disk, digital video disc, or USB storage device, to input and output data and code to and from the computing system 500 of FIG. 5. The system software for implementing embodiments of the present technology may be stored on such a portable medium and input to the computing system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information, and processes the information for output to the display device.

Peripheral device(s) 580 may include any type of computer support device to add additional functionality to the computing system. Peripheral device(s) 580 may include a modem or a router.

The components provided in the computing system 500 of FIG. 5 are those typically found in computing systems that may be suitable for use with embodiments of the present technology and are intended to represent a broad category of such computer components that are well known in the art. Thus, the computing system 500 of FIG. 5 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for generating a negotiated schema for multiple data sources, the method comprising:
    interrogating multiple data sources via a computing device communicatively couplable with each of the multiple data sources, each of the multiple data sources including different, unknown types of data structures that define how data is stored in each data source, the interrogation of at least one of the data sources including:
        comparing the unknown data structure of the data source to a plurality of schema templates,
        determining a fuzzy template match between the unknown data structure and one or more of the plurality of schema templates based on the comparison, and
        selecting a schema representing the unknown data structure that is a fuzzy template match between the unknown data structure and a schema template of one or more of the plurality of schema templates;
    generating a negotiated schema by:
        comparing the selected schemas of the multiple data sources to one another, the selected schemas including at least one schema representing the unknown data structure that is the fuzzy template match; and
        interrelating data points of the multiple data sources that correspond to one another;
    interrelating the negotiated schema with the selected schema for each of the multiple data sources based upon the interrelation of the data points; and
    storing the negotiated schema in a storage media by way of the computing device.

2. The method according to claim 1, wherein the interrogating of the multiple data sources includes:
    comparing the different, unknown types of data structures to a plurality of schema templates; and
    selecting one of the plurality of schema templates that at least partially matches the different, unknown types of data structures.

3. The method according to claim 2, wherein the comparing includes applying heuristic logic to the comparison, the heuristic logic being based upon at least one of end-user input, machine learning techniques, metadata tags, previous schema negotiations, predefined custom connectors, heuristics, and combinations thereof.

4. The method according to claim 1, wherein the interrelating data points of the multiple data sources includes establishing at least one of a fuzzy or a concrete relationship between data points.

5. The method according to claim 1, wherein the interrelating data points of the multiple data sources includes associating related data points with metadata that describe an interrelationship between the data points.

6. The method according to claim 5, wherein the metadata may include any of a data attribute, a schema information for each data source, and a confidence level for interrelated sets of data points.

7. The method according to claim 1, further comprising receiving verification from an end user that an interrelationship between data points is correct.

8. The method according to claim 1, further comprising:
    receiving a query for data against the negotiated schema from a client device; fulfilling the query by:
        obtaining data points from one or more of the multiple data sources by way of the negotiated schema; and
        combining the data points together according to the interrelationships included in the negotiated schema to create a query response; and
    providing the query response to the client device.

9. The method according to claim 8, automatically updating the negotiated schema when the different, unknown types of data structures of one or more of the data sources change.

10. The method according to claim 8, further comprising at least one of:
    selecting one or more alternative data sources when one or more required data sources are unavailable; and
    marking metadata in a returning result set appropriately if no alternative data source is available.

11. A system for generating a negotiated schema for multiple data sources, the system comprising:
    a memory for storing executable instructions; and
    a processor for executing the instructions, the instructions including:
        an interrogation module that interrogates multiple data sources, each of the multiple data sources including different, unknown types of data structures that define how data is stored in each data source, the interrogation of at least one of the data sources including:
            comparing the unknown data structure of the data source to a plurality of schema templates,
            determining a fuzzy template match between the unknown data structure and each of the plurality of schema templates based on the comparison, and
            selecting a schema representing the unknown data structure that is a fuzzy template match between the unknown data structure and a schema template of one or more of the plurality of schema templates; and
        a schema generator that generates a negotiated schema by:
            applying heuristic logic to determine correspondence between data points of the schemas of the multiple data sources to at least one of one another and one or more pre-existing schemas;
            interrelating data points of the multiple data sources that correspond to one another;
            interrelating the negotiated schema with selected schema for each of the multiple data sources based upon the interrelation of the data points; and
            storing the negotiated schema in a storage media.

12. The system according to claim 11, wherein the interrogation module further:
    compares the different, unknown types of data structures to a plurality of schema templates; and
    selects one of the plurality of schema templates that at least partially matches the different, unknown types of data structures.

13. The system according to claim 12, wherein the interrogation module compares the different, unknown types of data structures to a plurality of schema templates by applying heuristic logic, the heuristic logic being based upon at least one of end-user input, machine learning techniques, metadata tags, previous schema negotiations, custom predefined connectors, heuristics, and combinations thereof.

14. The system according to claim 11, wherein the interrelating data points of the multiple data sources includes the schema generator determining at least one of a fuzzy and a concrete relationship between data points of two or more data sources that at least partially correspond to one another.

15. The system according to claim 14, wherein the schema generator is configured to provide metadata that describes an interrelationship between the data points.

16. The system according to claim 15, wherein the metadata may include any of data type, schema determination information for each data source, and a confidence level for interrelated sets of data points.

17. The system according to claim 11, wherein the schema generator receives verification from an end user that an interrelationship between data points is correct.

18. The system according to claim 11, wherein the interrogation module is further configured to:
  receive a query for data against the negotiated schema from a client device;
  fulfill the query by:
    obtaining data points from one or more of the multiple data sources by way of the negotiated schema; and
    combining the data points together according to the interrelationships included in the negotiated schema to create a query response; and
  provide the query response to the client device.

19. The system according to claim 18, wherein the schema generator obtains metadata associated with data points and combines the metadata with the data points before the interrogation module provides the query response to the client device.

20. A non-transitory computer readable storage media having a program embodied thereon, the program being executable by a processor to perform a method for generating a negotiated schema for multiple data sources, the method comprising:
  interrogating multiple data sources via a computing device communicatively couplable with each of the multiple data sources, each of the multiple data sources including one or more different, unknown types of data structures that define how data is stored in each data source, the interrogation of each of the data sources including:
    comparing the unknown data structure of the data source to a plurality of schema templates,
    identifying a plurality of schema templates that partially correspond to the unknown data structure of the data source, and
    using heuristic logic to select a schema for representing the unknown data structure, the selected schema being a closest partial match between the unknown data structure and the plurality of identified schema templates;
  generating a negotiated schema by:
    establishing linkages between multiple data sources using an adaptive algorithm; and
    interrelating data points of the multiple data sources that correspond to one another;
  interrelating the negotiated schema with the selected schema for each of the multiple data sources based upon the interrelation of the data points; and
  storing the negotiated schema in a storage media by way of the computing device.

* * * * *